US007269706B2

(12) United States Patent
Agarwal et al.

(10) Patent No.: US 7,269,706 B2
(45) Date of Patent: Sep. 11, 2007

(54) ADAPTIVE INCREMENTAL CHECKPOINTING

(75) Inventors: Saurabh Agarwal, New Delhi (IN); Rahul Garg, Ghaziabad (IN); Meeta S Gupta, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 11/008,525

(22) Filed: Dec. 9, 2004

(65) Prior Publication Data

US 2006/0129610 A1 Jun. 15, 2006

(51) Int. Cl.
*G06F 12/00* (2006.01)
(52) U.S. Cl. ...................... 711/173; 712/228
(58) Field of Classification Search ............... 711/173
See application file for complete search history.

(56) References Cited

U.S. PATENT DOCUMENTS

| | | | |
|---|---|---|---|
| 6,154,877 A | 11/2000 | Ramkumar et al. | |
| 6,161,219 A | 12/2000 | Ramkumar et al. | |
| 6,289,474 B1 | 9/2001 | Beckerle | |
| 6,351,754 B1 | 2/2002 | Bridge, Jr. et al. | |
| 6,513,050 B1 * | 1/2003 | Williams et al. | 707/202 |
| 6,519,712 B1 | 2/2003 | Kim et al. | |
| 6,622,263 B1 | 9/2003 | Stiffler et al. | |
| 6,678,704 B1 | 1/2004 | Bridge, Jr. et al. | |
| 6,718,538 B1 | 4/2004 | Mathiske et al. | |
| 6,766,428 B2 | 7/2004 | Saulsbury et al. | |
| 7,039,663 B1 * | 5/2006 | Federwisch et al. | 707/205 |
| 7,200,705 B2 * | 4/2007 | Santos et al. | 711/6 |
| 2005/0050307 A1 * | 3/2005 | Reinhardt et al. | 712/227 |

OTHER PUBLICATIONS

H. Nam, J. Kim, S. J. Hong, and S. Lee, "Probabilistic checkpointing" *IEICE Transactions, Information and Ssytems*, vol. E85-D, Jul. 2002.
M. Litzkow, T. Tannenbaum, J. Basney, and M. Livny, "Checkpointing and migration of UNIX processes in the Condor distributed processing system" *Tech. Rep. UW-CS-TR-1346, University of Wisconsin—Madison Computer Sciences Department*, Apr. 1997.
J. S. Plank, M. Beck, G. Kingsley, and K. Li, "Libckpt: Transparent checkpointing under Unix" in *Usenix Winter Technical Conference*, pp. 213-223, Jan. 1995.

(Continued)

*Primary Examiner*—Brian R. Peugh
*Assistant Examiner*—Hashem Farrokh
(74) *Attorney, Agent, or Firm*—Gibb & Rahman, LLC; Marc McSwain, Esq.

(57) ABSTRACT

A method, apparatus and computer program product are disclosed for incrementally checkpointing the state of a computer memory in the presence of at least one executing software application at periodic instants. A secure hash function is periodically applied to each partitioned contiguous block of memory to give a periodic block hash value. At each periodic instant, a block hash value for each block is compared with a respective preceding block hash value to determine if said memory block has changed according to whether said block hash values are different. Only changed memory blocks are stored in a checkpoint record. The memory block sizes are adapted at each periodic instant to split changed blocks into at least two parts and to merge only two non-changed contiguous blocks at a time.

22 Claims, 5 Drawing Sheets

OTHER PUBLICATIONS

E. Elnozahy, "How safe is probabilistic checkpointing" in *Twenty Eight Annual International Symposium on Fault-Tolerant Computing,* pp. 358-363, 1998.

H. Nam, J. Kim, S. J. Hong, and S. Lee, "Secure Checkpointing" *Journal of Systems Architecture,* vol. 48, pp. 237-254, 2003.

A. J. Menezes, P. C. Oorschot, and S. A. Vanstone, "Handbook of Applied Crytography". 1997, pp. 38, 44, 338-351, CRC Press, Inc. ISBN: 0-8493-8523-7.

S. S. Mukherjee, C. Weaver, J. Emer, S. K. Reinhardt, and T. Austin, "A Systematic Methodology to Compute the Architectural Vulnerability Factors for a High-Performance Microprocessor" *Proc. 36th Annual Int'l Symp. on Microarchitecture (MICRO),* pp. 29-40, Dec. 2003.

Robert Baumann, "Soft Errors in Commerical Semiconductor Technology: Overview and Scaling Trends" *IEEE 2002 Reliability Physics Tutorial Notes, Reliability Fundamentals,* pp. 121_01.1 - 121_01.14, Apr. 7, 2002.

D.C.Bossen, J.M. Tendler, K. Reick, "Power 4 System Design for High Reliability" Micro, IEEE, vol. 22, Issue 2, Mar.-Apr. 2002, pp. 16-24.

\* cited by examiner

FIG. 4(A)    Memory Access Pattern at instance I

FIG. 4(B)    Merge all contiguous blocks

FIG. 4(C)    Memory Access Pattern at instance I+1

FIG. 4(D)    Split block [bcde]

FIG. 4(E)    Memory Access Pattern at instance I+2

FIG. 4(F)    Merge bc and de

ADAPTIVE INCREMENTAL CHECKPOINTING

FIELD OF THE INVENTION

The present invention relates to checkpointing the memory state of an executing software application.

BACKGROUND

Checkpointing is the process by which the memory state of an executing computer program is captured and stored on storage media, such as a disc drive, tape drive or CDROM. The stored state is called an image of the computer program at that instant of time. The image can be reloaded into a computer and the software application restarted to execute from the point where the checkpoint was taken. This is useful as a recovery process where a software application has experienced a fault or crashed. The practice of checkpointing is sometime referred to as taking a back-up, and is a critical feature of most computer systems.

The practice of checkpointing an entire memory state is somewhat inefficient, however, as it requires a memory storage facility of equal size to the operating computer system and also captures considerable redundant information because most information between across checkpoints does not change. Because of this, incremental checkpoint approaches have been proposed, being either page-based or hash-based.

In page-based incremental checkpointing techniques, memory protection hardware and support from a native operating system is required in order to track changed memory pages. The software application memory is divided into logical pages, and using support from the operating system, the checkpointing mechanism marks all changed pages as 'dirty'. At the time of taking a checkpoint, only the pages that have been marked dirty are stored in the checkpoint file. Of course, at the first checkpoint the full memory status is saved because its entirety is required as a baseline. At the time of a re-start, all of the incremental files and the first full checkpoint file are needed to construct a useable checkpoint file.

Hash-based incremental checkpointing uses a hash-function to compare and identify changed portions (called 'blocks') of memory and only saves those in a checkpoint file. Thus the application memory is divided into fixed sized blocks (which may be independent of an operating system page size). A hash-function H( ) maps a block B into a unique value H(B), being the H-value of the block. After taking a checkpoint, the hash of each memory block is computed and stored in a Hash table. At the time of taking the next checkpoint, the hash of each of the blocks is re-computed and compared against the previous hashes. If the two hashes differ, then the block is declared changed and it will be stored in the checkpoint file.

U.S. Pat. No. 6,513,050 (Williams et al), issued on Jan. 28, 2003, teaches an example of hash-based incremental checkpointing based on the use of a cyclic redundancy check. A checkpoint which describes a base file is produced by firstly dividing the base file into a series of segments. For each segment, a segment description is generated which comprises a lossless signature and lossey samples each describing the segment at a different level of resolution. A segments description structure is created from the generated segment descriptions as the checkpoint. The segments description structure is created by selecting a description that adequately distinguishes the segment from the lower level of resolution.

Both the page-based and hash-based incremental checkpointing techniques still save far more data than may actually be required. This is problematic, particularly as computer systems become larger and more complex since the checkpointing storage memory requirements increase, which is clearly undesirable.

SUMMARY

The invention is motivated by a first requirement that the determination of changed blocks of memory should not be limited to the granularity of a memory page size or a fixed block size. Rather, the size of the changed blocks should be adaptable to be near-exact to only the changed bytes in memory. Secondly, an algorithm to identify the near-exact boundaries of memory bytes must be efficient and relatively quick in operation. At a minimum, the time taken by the algorithm to identify near-exact changed bytes in changed pages should not exceed the time it would have taken to send the changed pages themselves to an associated I/O subsystem. Additionally, it is desirable to re-create a full checkpoint file from various incremental files.

The block size is heuristically determined and a table is formed to store hash values of the memory blocks. The stored-values are compared at the next checkpoint time to determine if a block has changed or not. The block boundaries are dynamically adjusted to capture near-exact changed bytes of memory, based on the memory access pattern of the application. Only the blocks marked as 'changed' are stored in the checkpoint file. Dynamic adjustment of the block boundaries occurs at each checkpoint time.

Dynamic adjustment of the block boundaries involves both a split operation and a merge operation. All changed blocks are first sorted in increasing order of size. A split (typically into two) is done for each block starting from the largest size. The split is done based on the observation that not every byte in a blocks changes, rather only a few bytes and these few bytes will most likely lie in one of the two halves. The spilt continues until all blocks are processed or until there is no space in the hash-table. A merge operation acts only on contiguous unchanged blocks. The merge is performed only on two contiguous unchanged blocks at a time, typically being the oldest contiguous unchanged blocks.

DETAILED DESCRIPTION

Overview

Figure 1:
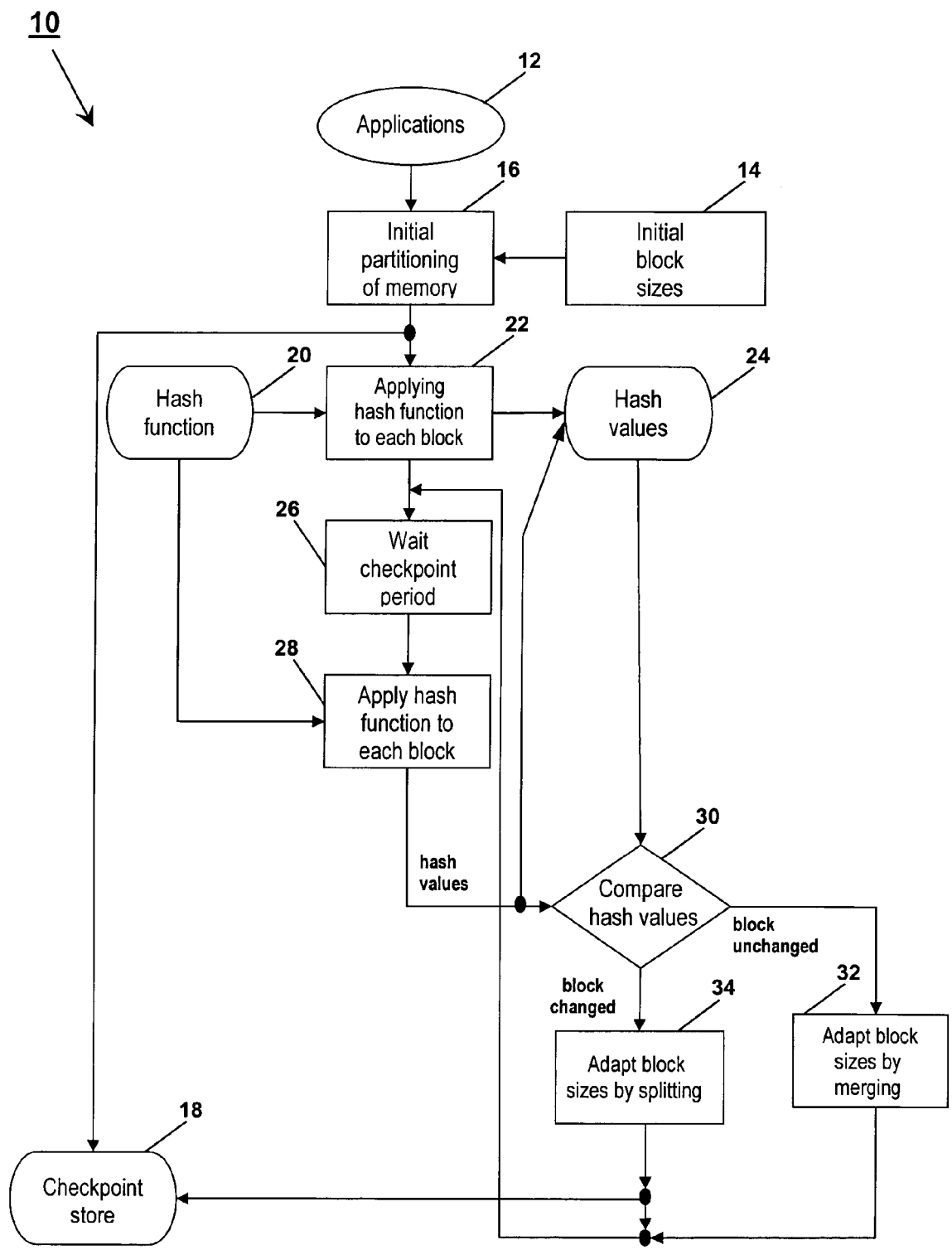
FIG. 1 is a schematic representation of a checkpointing process.

FIG. 1 shows a checkpointing process 10 embodying the invention. One or more software applications 12 are taken to be executing and affecting the memory state of a computer. Assuming the checkpointing processes are starting for the first time, then an initialization process is required. Initial block sizes are determined (step 14), which can conveniently be the logical page size of the memory. The memory is then partitioned into equal block sizes (step 16). The resulting partition represents an initial checkpoint value submitted to a checkpoint store (step 18). A given hash function 20 is applied to each block (step 22), to generate a respective hash value for each block, which is stored in a hash value register 24.

A checkpoint period of time is allowed to elapse (step 26), then the first updating checkpoint process is performed, by applying the hash function 20 to each block (step 28), which generates resultant hash values. The new hash values are used to update the previously stored hash values 24. Before that updating process is performed, the new hash values are compared against the previous hash values. In the event that the respective hash values remain the same then it is concluded that the blocks are unchanged, and an adaptation of block size is performed by a merging of at least two contiguous blocks (step 32) (i.e. such that the resultant block is of a size representing the 'addition' of the two contiguous blocks). In the event that the comparison of the hash values disagrees, then it is concluded that the block has changed since the last checkpoint instance, and an adaptation of a respective block sizes is performed by a splitting of each block (step 34). Only the changed blocks resulting from the splitting step 34 are then passed to the checkpoint store 18.

The process 10 then returns to wait for the next checkpoint period to elapse (step 26) before continuing as before. In this way an incremental checkpointing is performed that adapts the size of the memory blocks to be near-exact in size to capture only changed bytes of memory. In other words, the block boundaries adapt to capture only changed bytes between checkpointing processes, thus representing the near-minimum information required to be captured, and reducing the incremental checkpoint file size to a near-minimum value.

Adaptive Incremental Checkpoint Algorithm

Figures 2A, 2B, 2C, 2D:
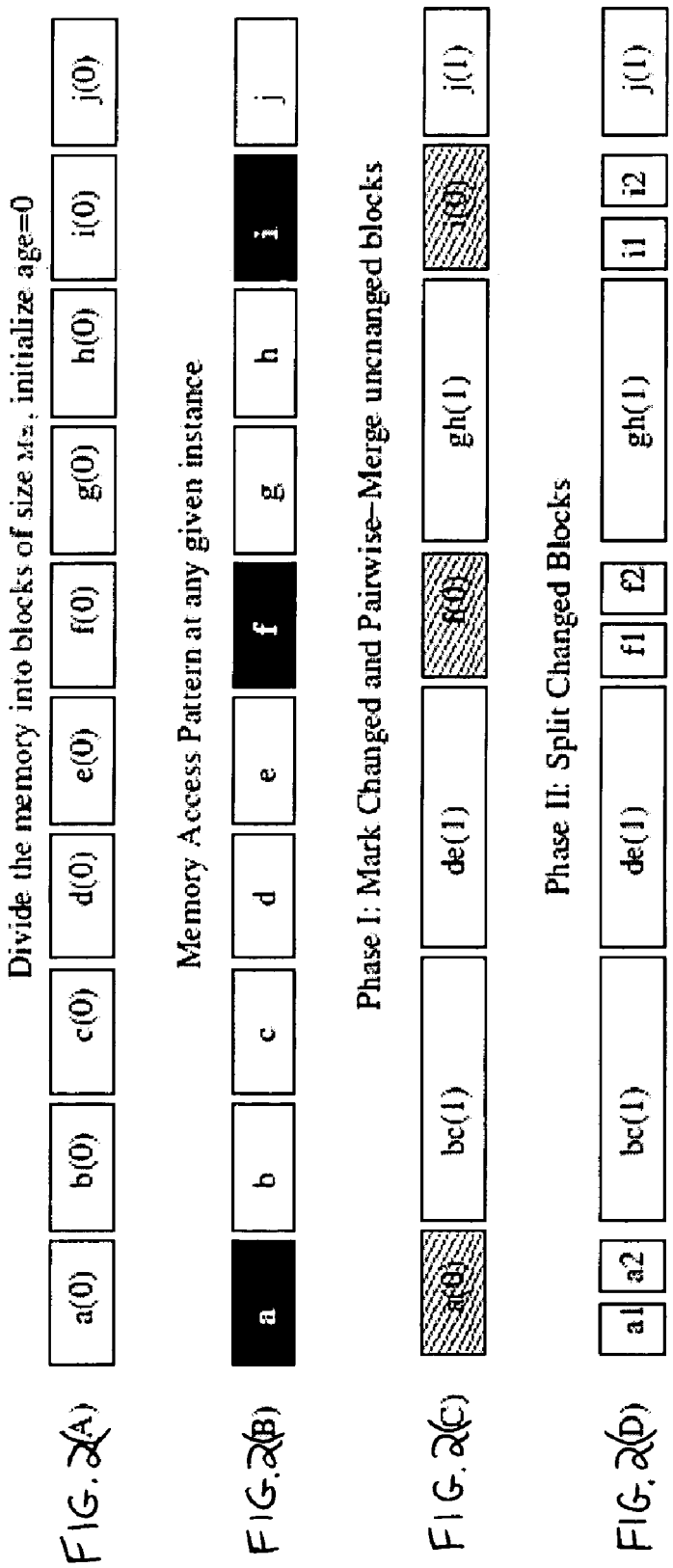
FIGS. 2A-2D show the adaptation of individual memory block sizes.

A specific implementation example will now be described. A hash table of size n (in unit of entries) is allocated for an application using a memory of M bytes. (See below for a discussion of how to decide n). This allows the entire application memory to be divided into n blocks, each of initial block size equal to M/n. FIG. 2A shows such an initial memory partitioning. A parameter called age is associated with each block, which defines the number of consecutive times a particular block was not modified. In FIG. 2A, the age of each block is initialized to zero.

An age tracking mechanism is used to identify blocks which have been unmodified some number of times, and hence could be merged. Merging is based on the assumption that none of these blocks will be changed in the near future (due to the locality of reference principle). As described above, the hash value of each block of the memory is computed and compared against the value stored in the hash table 24. If the two values differ, then the corresponding block is marked as 'dirty' (i.e. has changed) and is saved into the checkpoint file 18. Otherwise, if the two hash values are same, then the age of the block is incremented, and all un-changed blocks are scanned to find merge opportunities. A merge can happen for all contiguous un-changed blocks having same age. For instance FIG. 2B shows changed (i.e. black) and un-changed (i.e. white) blocks identified in an iteration. All changed blocks will be marked 'dirty' (i.e. grayed, as in FIG. 2C) and all un-changed blocks will be merged in pairs of two (as also shown in FIG. 2C). At one instance, no more than two contiguous blocks can be merged. This is referred to as a lazy-merge optimization, and is explained further below.

The algorithm now sorts the list of changed blocks by size, and starts splitting the largest changed block first, until there is no space left in the hash-table 24, or the list is empty. For each block that is split, age is reset to 0. FIG. 2D shows all changed (grayed) blocks of FIG. 2C as split into two. This split-merge technique continues at each checkpoint instance, and over a period of time. The trend is for each changed block to be of near-minimum possible size, while each un-changed block is of near-maximum possible size.

Restart Algorithm

A standalone merge utility is now described, which merges all the incremental checkpoint files into a single non-incremental checkpoint file. The executing application can be restarted from this file. This utility can be used by system administrators to periodically merge various incremental files into a single checkpoint file (online), thereby reducing on space as well as the time to restart the application. The algorithm to merge is as follows:

Read the latest incremental checkpoint file and write all sections into the final file (since its all sections are latest).

For each subsequent file in reverse order, from (n-1) down to 1, find address ranges not already written in the final file, and copy the corresponding blocks into the final file. This ensures that only the most recent blocks are written into the final checkpoint file.

The final file thus obtained is the complete nth checkpoint file, ready to be used for re-start.

Determination of Initial Block Size

The initial block size is generally empirically determined, based on following prior information:

1. Application specific knowledge (based on profiled data) which can specify what is the most typical data page size this application would use.
2. Most commonly used page size on the particular operating system [e.g.: 4 kilobytes in Linux™].
3. Domain specific knowledge: for instance, scientific programs would operate on large pages, while search programs will operate upon small pages.
4. Any other intuition gained from domain knowledge and expertise, to know the data access pattern of the program(s) that will be executed.

Choice of Hash Function

Figure 3:
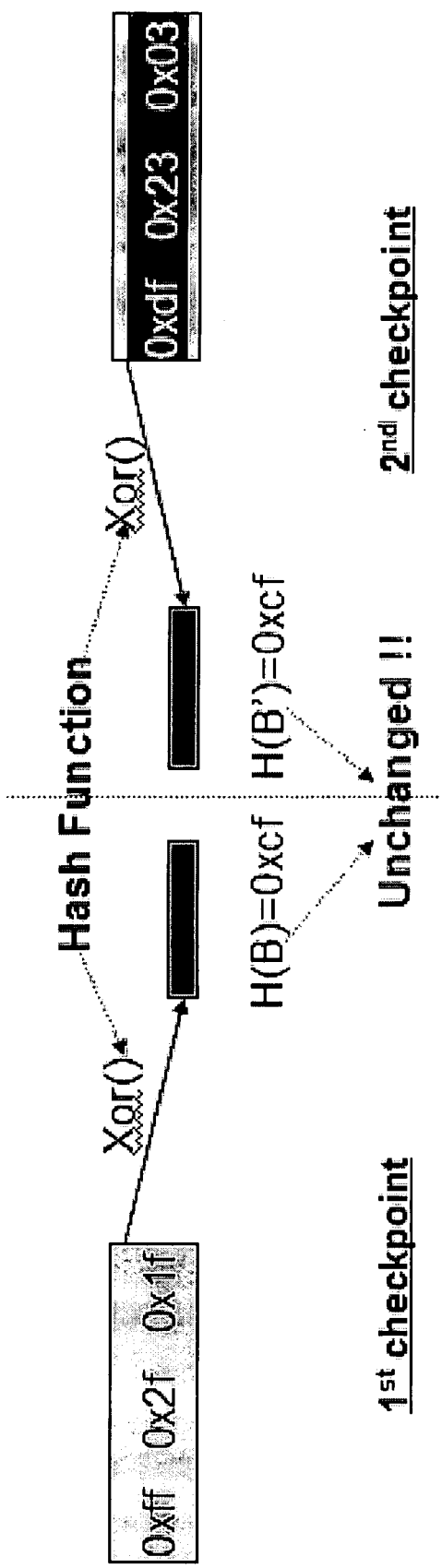
FIG. 3 shows an example of aliasing.

As will be readily appreciated by those skilled in the art, there are various known hash functions already available, for example: CRC, X-OR, SHA-1, and SHA-2. The hashing technique, by definition, suffers from a fundamental limitation, being the problem of aliasing. As shown in the FIG. 3, imagine a block B, which has data as shown in the left hand side, at the time of first checkpoint. A simplistic hash function X or ( ) is used to calculate a hash value H(B). At the second checkpoint, the data in the block changed as shown in the right hand side of the FIG. 3. The same hash function X or ( ) is used to calculate the new hash value H(B'). It would be expected, according the algorithm, that since the block has changed, their hash values must be different, but in fact, they are not. This is the problem of aliasing, where one can incorrectly deduce that a block has not changed, when in reality it has. Therefore, a hash function that suffers from gross aliasing is not suitable.

Only secure hash functions should be used. By 'secure', it is meant that it is computationally very difficult to find two blocks B1 and B2 such that H(B1)=H(B2). A suitable algorithm is MD5, the algorithm for which is described, for example, in A. J. Menezes, P. C. Oorschot, and S. A. Vanstone, "Handbook of Applied Cryptography", 1997, page 347, CRC Press, Inc., and incorporated herein by reference. Of course, other secure hash functions can equally be used.

Optimal Hash-Table Size

The ability of the adaptive incremental checkpoint algorithm to adapt to memory access patterns and perform a fine-grained block boundaries adjustment depends on how much space is available in the hash table. If a very small hash table is used, one may not see much benefit because the algorithm would not be able to achieve fine granularity. On the other hand, a large hash table generally consumes additional memory resources which one would like to minimize, and use instead for the application. The size of the hash table would usually depend on how much extra memory is available for scratch use in the system, which in turn depends on the application's memory footprint. This is determined at runtime, and it is sought to utilize anywhere between 5%-10% of application's memory for this purpose.

Storing the Hash-Table

The hash table may either be stored in the memory or written to the checkpoint file. Storing the hash table in memory increases the application memory requirement, while storing the hash table in checkpoint file increases its size and adds to the I/O overhead. If the hash table is stored in the checkpoint file, it needs to be read into the memory at the next checkpoint. This further increases the I/O overhead. Moreover, to avoid adding to the application memory overhead, the hash table needs to be read in small blocks and compared against the memory. This not only increases the complexity of implementation but also degrades I/O performance. It is preferred to keep the hash table in the memory. Note that hash table is only used for the checkpointing logic, and it has no role to play at the time of recovery. Hence, even if the hash table was lost, there is no correctness issue with respect to the recovery logic.

Splitting

Blocks are split in order to isolate tightest possible boundaries, but care must be taken not to divide into so small chunks that the header overhead (32 bytes) of the hash-table entry becomes greater than the actual data. Moreover, one should split intelligently, to maximize the potential benefits. If large changed blocks are split, there is potential for greater savings. Therefore, the adaptive incremental checkpoint algorithm splits large changed blocks first, and if space remains, splits the smaller blocks. In one embodiment, the split is up to a maximum block size of 32 bytes.

Merging

One approach to the merging operation is to be greedy and merge all contiguous un-changed blocks at once, hoping to free-up several hash-table entries. But this approach can backfire if the subject application modifies a large data-structure in alternate iterations. In such a case, at every iteration there is an un-necessary split and merge, and cost is paid in terms of re-hashing time.

Figure 4A:
FIGS. 4A-4F show instances of merging blocks.
Figure 4B:
Figure 4C:
Figure 4D:
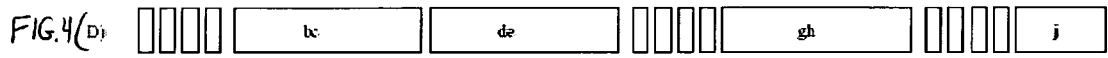
Figure 4E:
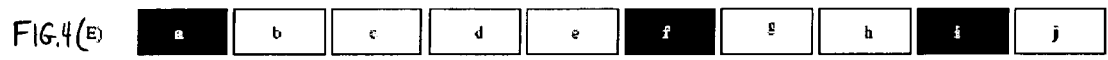
Figure 4F:
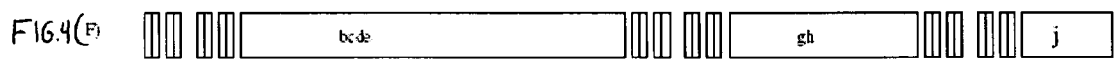

FIG. 4A, shows a few changed (i.e. black) and a few un-changed (i.e. white) blocks at instance I. Assuming there was no lazy-merge, then after the first pass, all changed blocks will be split and all un-changed blocks will be merged as shown in FIG. 4B. Now suppose at instance I+1, memory areas (a,c,f,i) change, as shown in FIG. 4C. All changed blocks (i.e. from FIG. 4B) will again be split (as shown in FIG. 4D), including the block 'bcde', which was merged in the previous iteration. In the next iteration I+2 (as shown in FIG. 4E), no area from this chunk was modified again, so it is again merged into 'bcde', as shown in FIG. 4F. Such a situation easily leads to 'thrashing', as splits and merges happen too fast. Therefore, the preference is to do a slow, pairwise merge, using the ageing criterion. This ensures that even if there is a large number of contiguous unchanged blocks, the algorithm merges them in pairs. For n contiguous unchanged blocks of same age, the adaptive incremental checkpointing algorithm will take log(n) checkpoints to merge them into a single block.

Computer Hardware

Figure 5:
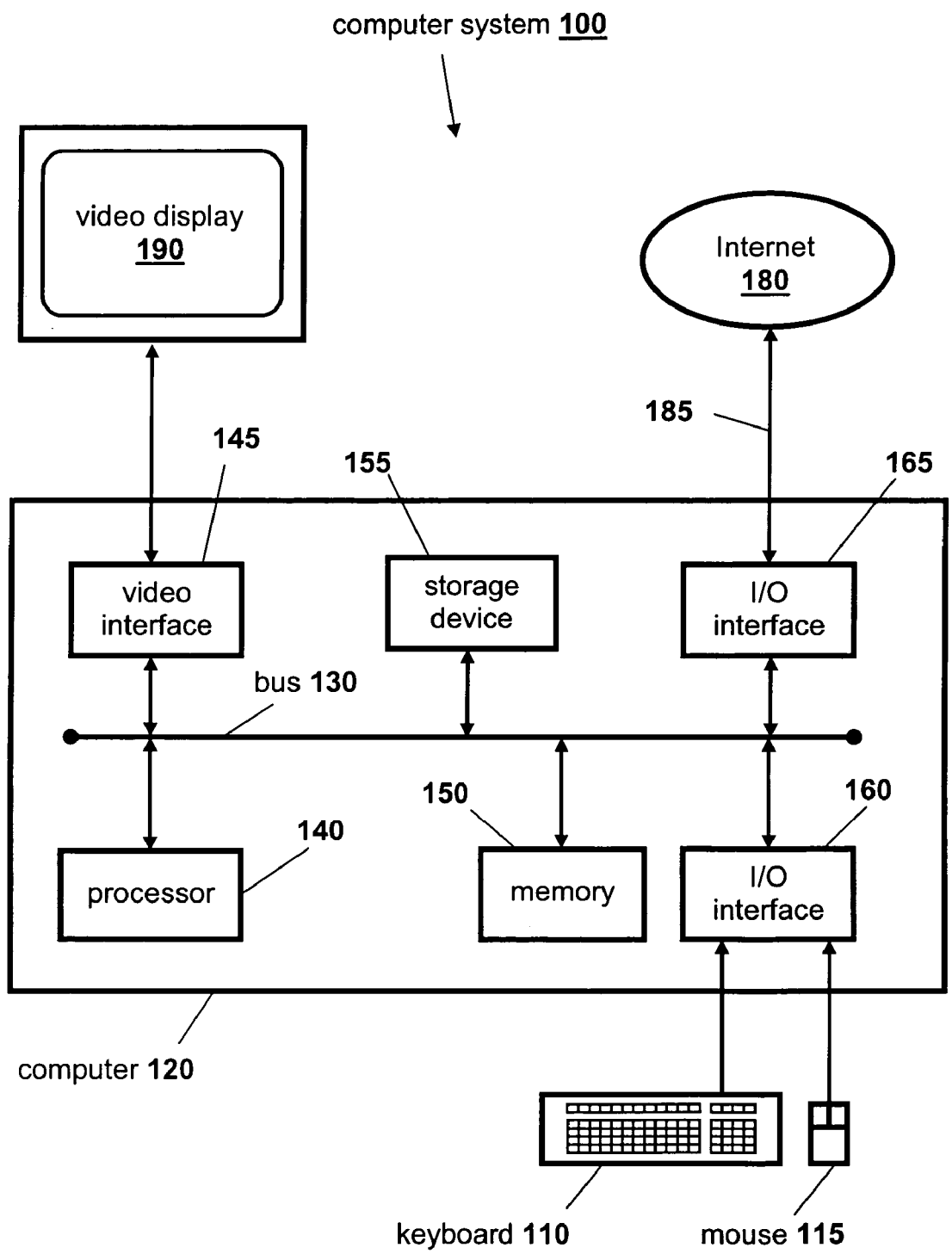
FIG. 5 is a schematic representation of a computer system suitable for performing the techniques described herein.
Figure 2A:
Figure 2B:
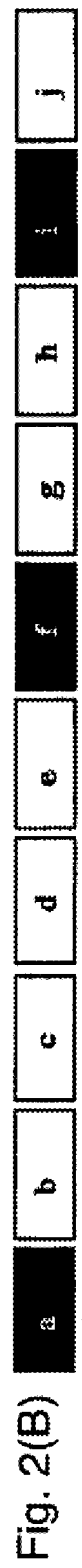
Figure 2C:
Figure 2D:
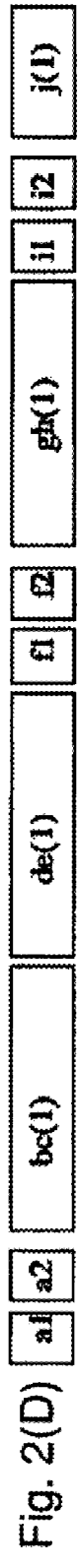

FIG. 5 is a schematic representation of a computer system 100 of a type that is suitable for executing computer software for checkpointing the state of a computer memory.

Computer software executes under a suitable operating system installed on the computer system 100, and may be thought of as comprising various software code means for achieving particular steps.

The components of the computer system 100 include a computer 120, a keyboard 110 and mouse 115, and a video display 190. The computer 120 includes a processor 140, a memory 150, input/output (I/O) interfaces 160, 165, a video interface 145, and a storage device 155.

The processor 140 is a central processing unit (CPU) that executes the operating system and the computer software executing under the operating system. The memory 1050 includes random access memory (RAM) and read-only memory (ROM), and is used under direction of the processor 140.

The video interface 145 is connected to video display 190 and provides video signals for display on the video display 190. User input to operate the computer 120 is provided from the keyboard 110 and mouse 115. The storage device 155 can include a disk drive or any other suitable storage medium.

Each of the components of the computer 120 is connected to an internal bus 130 that includes data, address, and control buses, to allow components of the computer 120 to communicate with each other via the bus 130.

The computer system 100 can be connected to one or more other similar computers via a input/output (I/O) interface 165 using a communication channel 185 to a network, represented as the Internet 180.

The computer software may be recorded on a portable storage medium, in which case, the computer software program is accessed by the computer system 100 from the storage device 155. Alternatively, the computer software can be accessed directly from the Internet 180 by the computer 120. In either case, a user can interact with the computer system 100 using the keyboard 110 and mouse 115 to operate the programmed computer software executing on the computer 120.

Other configurations or types of computer systems can be equally well used to execute computer software that assists in implementing the techniques described herein.

CONCLUSION

Various alterations and modifications can be made to the techniques and arrangements described herein, as would be apparent to one skilled in the relevant art.

We claim:

1. A method for incrementally checkpointing the state of a computer memory in the presence of at least one executing software application at periodic instances, the method comprising:
   periodically applying a secure hash function to each partitioned contiguous block of memory to give a periodic block hash value;
   at each periodic instant, comparing said block hash value for each block with a respective preceding said block hash value to determine if said memory block has changed according to whether said block hash values are different;
   storing only changed memory blocks in a checkpoint record; and
   wherein said memory block sizes are adapted at each periodic instant to split changed blocks into at least two parts and to merge only two non-changed contiguous blocks at a time.

2. The method of claim 1, wherein only oldest non-changed contiguous blocks are merged at said periodic instances.

3. The method of claim 1, wherein changed blocks are split only into two parts.

4. The method of claim 1, further comprising:
   adaptively determining memory block sizes; and
   partitioning said memory into contiguous blocks according to the determined block sizes.

5. A method for incrementally checkpointing the state of a computer memory in the presence of at least one executing software application at periodic instants comprising, at each said periodic instant, said method comprises:
   determining which memory blocks have changed;
   splitting changed memory blocks into at least two parts;
   storing said split memory blocks into a checkpoint file; and
   merging any two non-changed contiguous blocks.

6. The method of claim 5, wherein only two said non-changed contiguous blocks are merged at any said periodic instant.

7. The method of claim 6, further comprising generating periodic block hash values for each block of memory, and wherein said step of determining which memory blocks have changed includes, for each block, comparing a current block hash value with a previous block hash value to identify any difference.

8. The method of claim 7, further comprising:
   adaptively determining memory block sizes; and
   partitioning said memory into contiguous blocks according to said determined block sizes.

9. A method for generating a checkpoint file of the state of a computer memory in the presence of an executing software application from which said executing software application can be restarted, said method comprising:
   retrieving a latest incremental stored checkpoint file;
   writing said latest incremental stored checkpoint file into a full checkpoint file;
   retrieving each next most recent stored incremental checkpoint file in turn; and
   for each incremental file identifying address ranges not already written into said full checkpoint file, copying the incremental files identified by the address ranges into said full checkpoint file until all said stored incremental checkpoint files have been processed.

10. The method of claim 9, wherein said stored incremental checkpoint files are created by:
    periodically applying a secure hash function to each partitioned contiguous block of memory to give a periodic block hash value;
    at each periodic instant, comparing said block hash value for each block with a respective preceding said block hash value to determine if said memory block has changed according to whether said block hash values are different;
    storing only changed memory blocks in a checkpoint record; and
    wherein said memory block sizes are adapted at each periodic instant to split changed blocks into at least two parts and to merge only two non-changed contiguous blocks at a time.

11. The method of claim 9, wherein said stored incremental checkpoint files are created by:
    determining which memory blocks have changed;
    splitting changed memory blocks into at least two parts;
    storing said split memory blocks into a checkpoint file; and
    merging any two non-changed contiguous blocks.

12. A computer program product comprising a computer program carried on a storage medium, said computer program including code means for performing a method for incrementally checkpointing the state of a computer memory in the presence of at least one executing software application at periodic instances, said method comprising:
    periodically applying a secure hash function to each partitioned contiguous block of memory to give a periodic block hash value;
    at each periodic instant, comparing said block hash value for each block with a respective preceding said block hash value to determine if said memory block has changed according to whether said block hash values are different;
    storing only changed memory blocks in a checkpoint record; and
    wherein said code means adapts memory block sizes at each periodic instant to split changed blocks into at least two parts and to merge only two non-changed contiguous blocks at a time.

13. A computer program product comprising a computer program carried on a storage medium, said computer program including code means for performing a method for incrementally checkpointing the state of a computer memory in the presence of at least one executing software application at periodic instants comprising, at each said periodic instant, said method comprises:
    determining which memory blocks have changed;
    splitting changed memory blocks into at least two parts;
    storing said split memory blocks into a checkpoint file; and
    merging any two non-changed contiguous blocks.

14. A computer system comprising:
    a memory in which at least one software application is being executed; and
    a processor configured for incrementally checkpointing the state of the memory at period instants by periodically applying a secure hash function to each partitioned contiguous block of memory to give a periodic block hash value, and at each said periodic instant comparing said block hash value for each block with a respective preceding said block hash value to determine if said memory block has changed according to whether said block hash values are different, and storing only changed memory blocks in a checkpoint record;

and wherein said processor adapts said memory block sizes at each periodic instant to split changed blocks into at least two parts and to merge only two non-changed contiguous blocks at a time.

15. The system of claim 14, wherein the processor merges only oldest non-changed contiguous blocks at said periodic instants.

16. The system of claim 14, wherein the processor splits changed blocks only into two parts.

17. The system of claim 14, wherein the processor adaptively determines memory block sizes, and partitions said memory into contiguous blocks according to said determined block sizes.

18. A computer system comprising:
a memory in which at least one software application is being executed;
a processor for incrementally checkpointing the state of the memory at period instants by, at each periodic instant, determining which memory blocks have changed, splitting changed memory blocks into at least two parts, storing said split memory blocks into a checkpoint file, and merging any two non-changed contiguous blocks.

19. The system of claim 18, wherein said processor merges only two said non-changed blocks at any periodic instant.

20. The system of claim 19, wherein said processor further generates periodic block hash values for each block of memory, and wherein determining which memory blocks have changed includes, for each block, comparing a current block hash value with a previous block hash value to identify any difference.

21. The system of claim 20, wherein said processor adaptively determines memory block sizes, and partitions said memory into contiguous blocks according to said determined block sizes.

22. A computer system comprising:
a memory in which at least one software application is being executed; and
a processor for generating a checkpoint file of the state of a computer memory from which said executing software application can be restarted, said processor retrieving the latest incremental stored checkpoint file from a checkpoint store and writing said latest file into a full checkpoint file, retrieving each next most recent stored incremental checkpoint file in turn from said store, and for each incremental file identifying address ranges not already written into said full checkpoint file and copying the incremental files identified by the address ranges into said full checkpoint file until all said stored incremental checkpoint files have been processed.

* * * * *

UNITED STATES PATENT AND TRADEMARK OFFICE
CERTIFICATE OF CORRECTION

PATENT NO. : 7,269,706 B2
APPLICATION NO. : 11/008525
DATED : September 11, 2007
INVENTOR(S) : Agarwal et al.

It is certified that error appears in the above-identified patent and that said Letters Patent is hereby corrected as shown below:

Please substitute Figs. 2A-2D and 4A-4F of the drawings with the attached Replacement Sheets of Figs. 2A-2D and 4A-4F. See attached sheets Signed and Sealed this First Day of April, 2008

JON W. DUDAS
*Director of the United States Patent and Trademark Office*

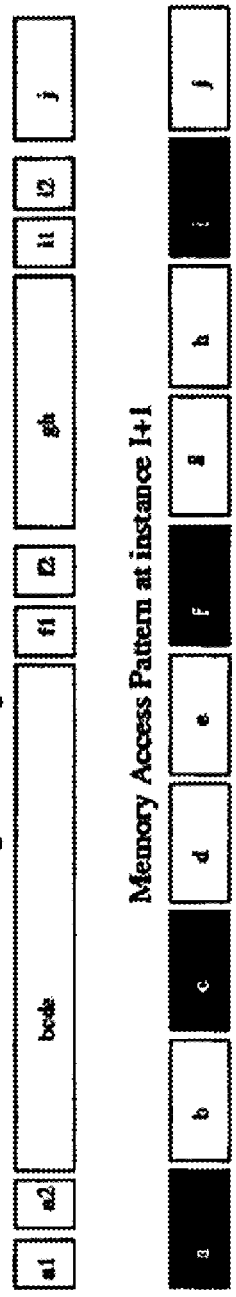
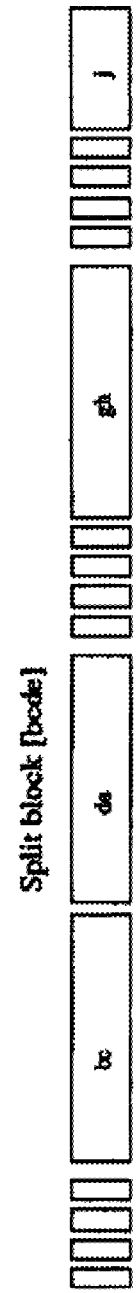
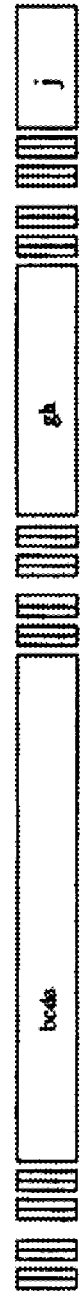
Figures 4A - 4F